Figure 6:
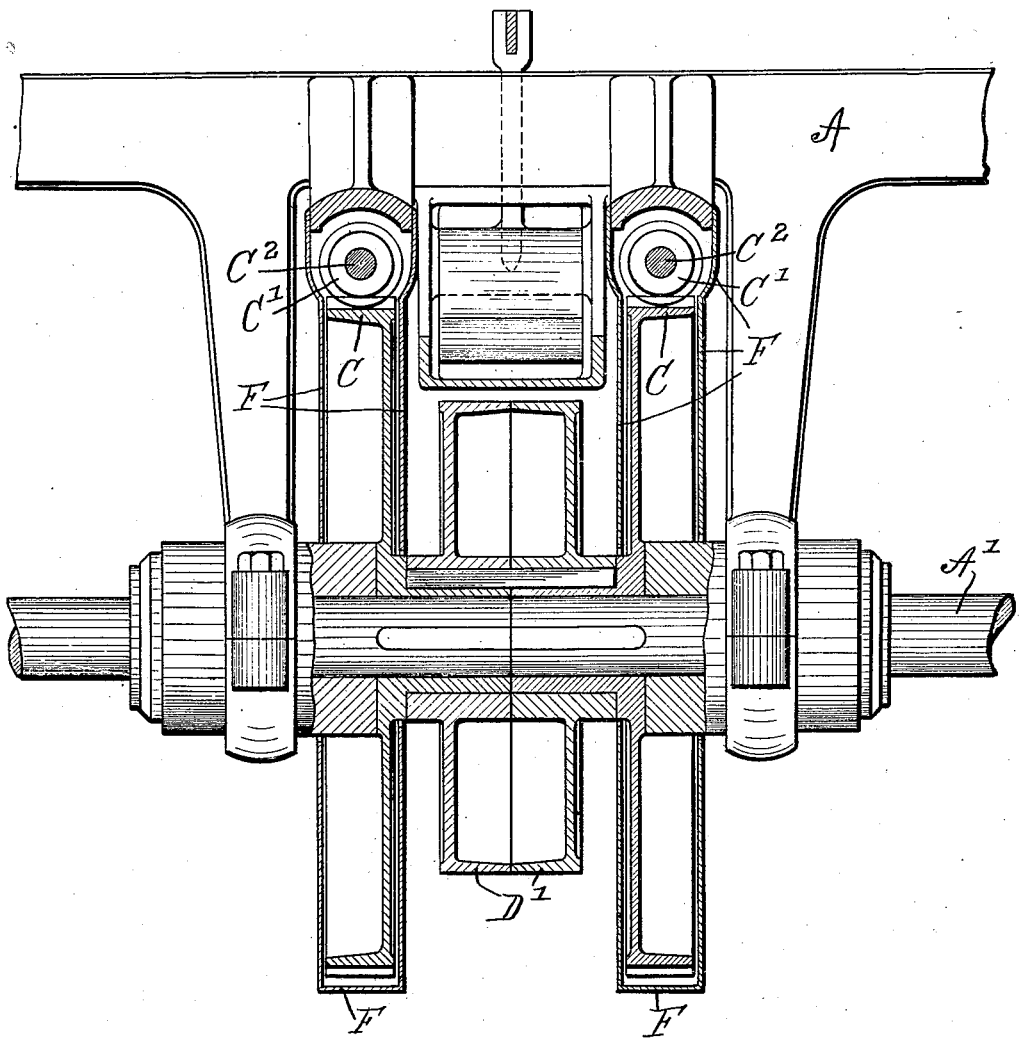

No. 700,743. Patented May 27, 1902.
W. A. CROWDUS.
MOTOR VEHICLE.
(Application filed June 25, 1901.)
(No Model.) 5 Sheets—Sheet 1.
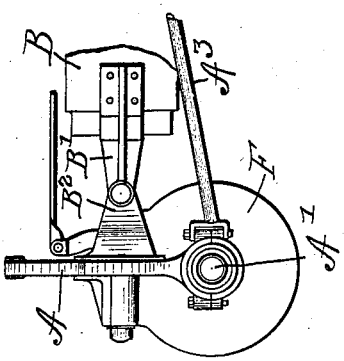
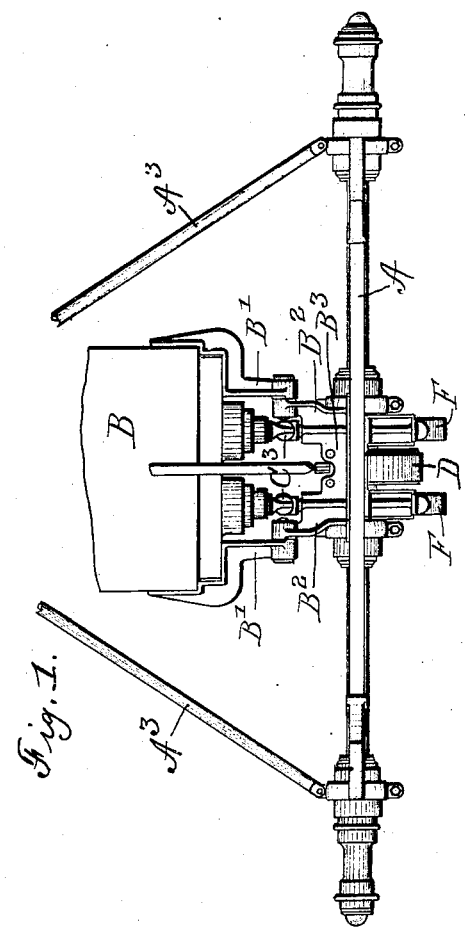
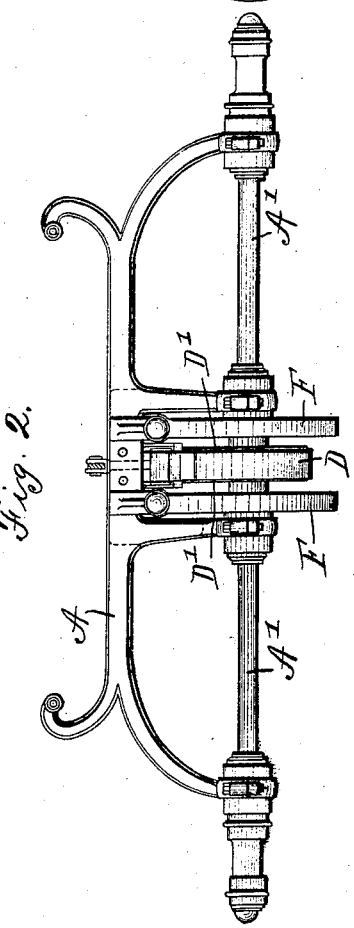
WITNESSES:
INVENTOR.
Walter A. Crowdus,
BY
ATTORNEY.

No. 700,743. Patented May 27, 1902.
W. A. CROWDUS.
MOTOR VEHICLE.
(Application filed June 25, 1901.)
(No Model.) 5 Sheets—Sheet 2.
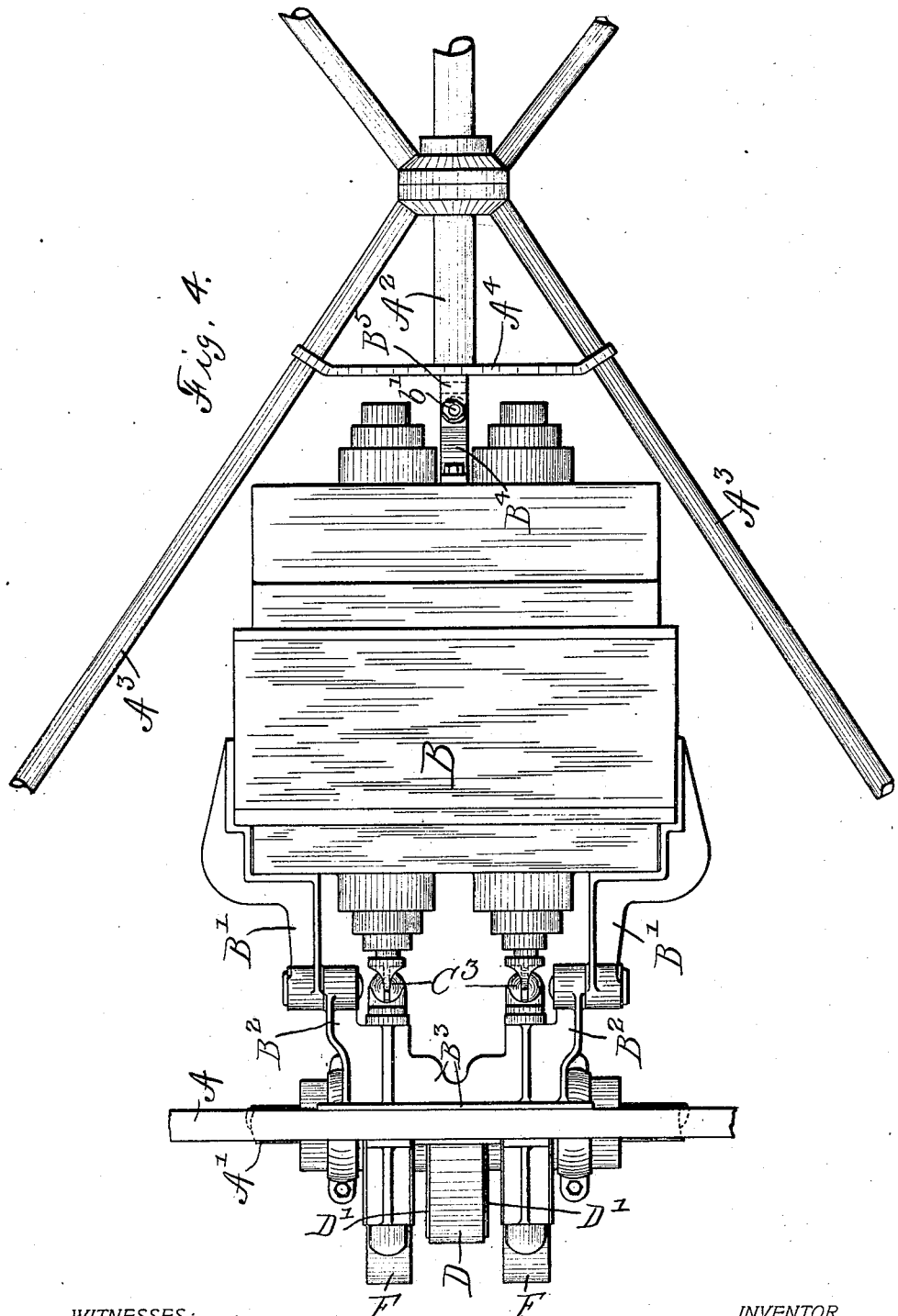
WITNESSES:
INVENTOR.
Walter A. Crowdus,
BY
ATTORNEY.

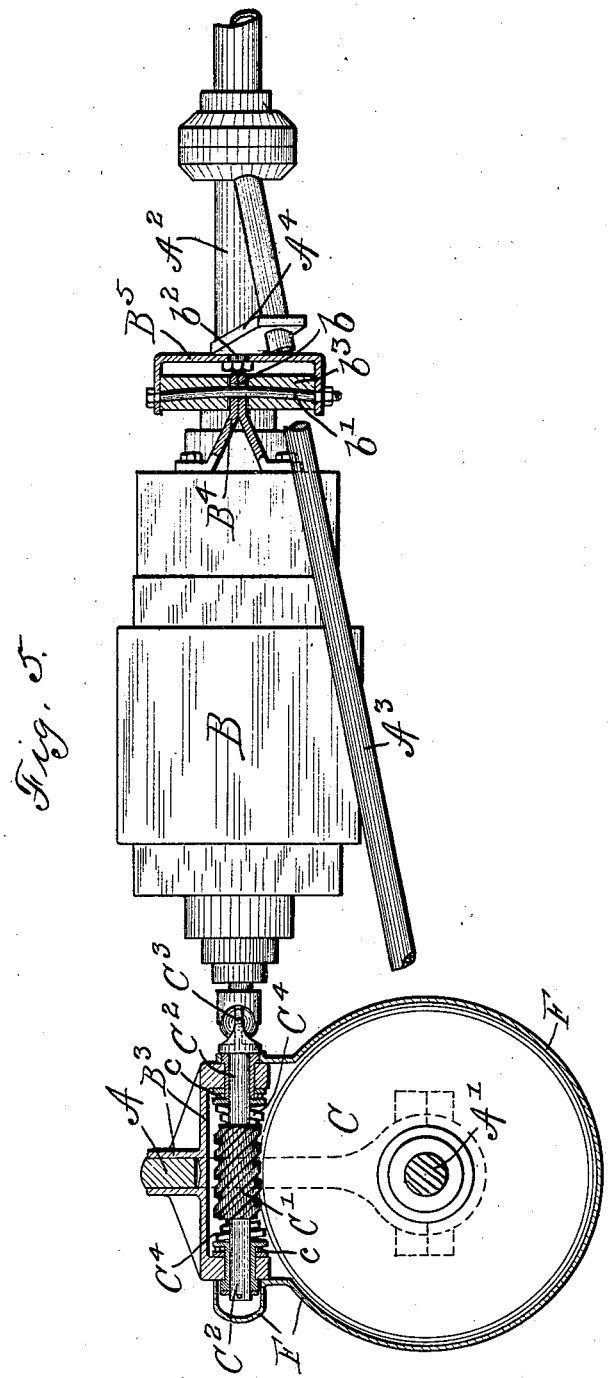

No. 700,743. Patented May 27, 1902.
W. A. CROWDUS.
MOTOR VEHICLE.
(Application filed June 25, 1901.)
(No Model.) 5 Sheets—Sheet 4.

WITNESSES:
INVENTOR.
Walter A. Crowdus,
BY
ATTORNEY.

No. 700,743. Patented May 27, 1902.
W. A. CROWDUS.
MOTOR VEHICLE.
(Application filed June 25, 1901.)
(No Model.) 5 Sheets—Sheet 5.
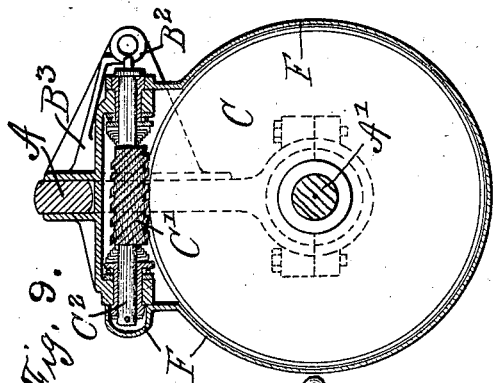
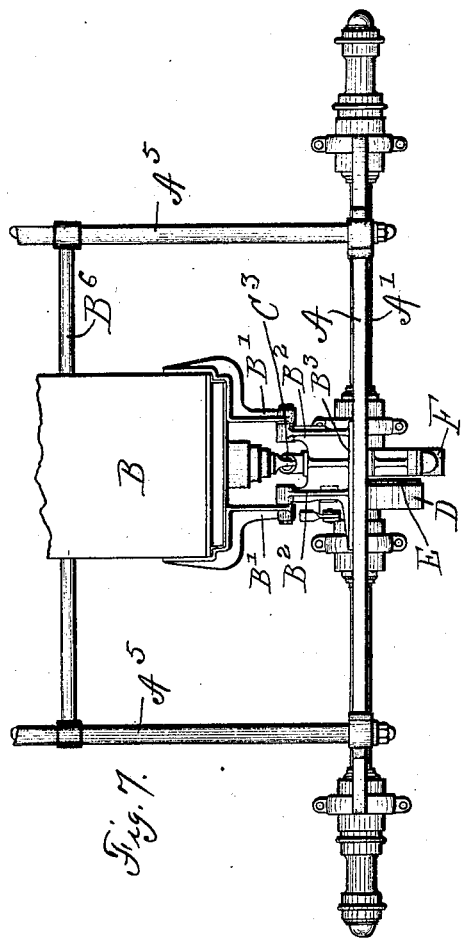
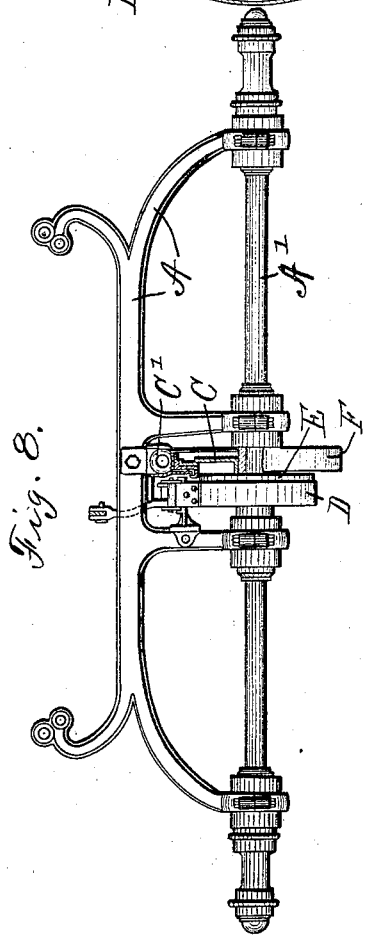
WITNESSES:
INVENTOR.
Walter A. Crowdus,
BY
ATTORNEY.

UNITED STATES PATENT OFFICE.

WALTER A. CROWDUS, OF CHICAGO, ILLINOIS.

MOTOR-VEHICLE.

SPECIFICATION forming part of Letters Patent No. 700,743, dated May 27, 1902.

Application filed June 25, 1901. Serial No. 65,943. (No model.)

*To all whom it may concern:*

Be it known that I, WALTER A. CROWDUS, a citizen of the United States, and a resident of Chicago, in the county of Cook and State of Illinois, have invented certain new and useful Improvements in Motor-Vehicles, of which the following is a specification.

This invention relates to motor-vehicles, and relates particularly to means for supporting the motor and to the driving mechanism particularly of electrically-propelled motor-vehicles.

Among the objects of the invention are to provide means for supporting the motor whereby the jar or jolt upon the vehicle-gear or underframe due to the weight of the motor, particularly when passing over rough roads, will be reduced to a minimum, to provide a driving-gear in combination with the motor whereby it is rendered possible to drive the vehicle by means of a flexibly-suspended motor, and to provide a connection between the motor and the driving-gear whereby the motor will "pick up" its load gradually, thereby avoiding the sudden jerk due to starting a motor which is unyieldingly connected to the driving-gear.

A further object of the invention is to provide a motor operatively connected to the driving or traction wheels of the vehicle in such manner that said driving or traction wheels will be revoluble independently of each other and in such manner also that the power of the motor will be automatically divided between said driving or traction wheels in proportion to the load imposed thereon, or in case said motor becomes inoperative as to one of the driving or traction wheels that practically the entire power of the motor will be applied to the other driving or traction wheel.

To effect these various objects, my invention consists of the various features, combinations of features, and details of construction hereinafter described and claimed.

In the accompanying drawings a motor-vehicle embodying my invention is fully illustrated.

Figure 1 is a partial top plan view of a motor-vehicle gear or underframe and of the driving mechanism of a motor-vehicle of my invention. Fig. 2 is a rear view thereof. Fig. 3 is a side view thereof. Fig. 4 is an enlarged top plan view of the driving mechanism shown in Fig. 1. Fig. 5 is an enlarged side view, partly in section, of Fig. 4. Fig. 6 is an enlarged rear view, partly in section, of the parts shown in Fig. 4. Fig. 7 is a partial top plan view of a vehicle-gear or underframe and of the driving mechanism of a motor-vehicle embodying my invention in a slightly-modified form. Fig. 8 is a rear view thereof, partly in section; and Fig. 9 is a side view, partly in section, thereof.

I will first describe the vehicle illustrated in Figs. 1 to 6 of the drawings, which embodies my invention in what I now consider its preferable form.

The gear or underframe of the vehicle (shown in Figs. 1 to 6) comprises a rear-axle support A; an axle A', comprising separate sections revolubly mounted in suitable bearings in said axle-support; a reach $A^2$, which terminates in front of the rear axle; truss-rods or struts $A^3$, which connect the rear-axle support A with the reach, and a brace $A^4$, which connects the truss-rods or struts $A^3$ with the reach $A^2$ at or adjacent to its rear end. Said frame is of the general type shown, described, and claimed in an application filed by me in the United States Patent Office on the 25th day of June, 1901, and numbered serially 65,941, to which reference is made for a more detailed description thereof.

In the preferable construction shown the motor (indicated at B) is pivotally supported upon the rear-axle support A and the reach $A^2$ in the following manner: Secured to the motor-casing are arms B', which are hinged to arms $B^2$, formed on a bracket or frame-piece $B^3$, rigidly secured to the rear-axle support, and an arm or projection $B^4$, provided with a hole or opening $b$ in its outer end which engages a vertically-disposed bolt or pin $b'$, rigidly secured in the lateral members of a U-shaped head $B^5$, secured to the rear end of the reach $A^2$ by means of a stud-bolt $b^2$, brazed or otherwise rigidly secured to said reach. Inserted between the arm or projection $B^4$ and the lateral members of the U-shaped head $B^5$ are cushions $b^3$, which preferably encircle the bolt or pin $b'$ as a guide. As shown, said cushions $b^3$ are made of rubber, but may consist of coiled springs or other suitable cushion.

With the described construction it is obvious that the motor B will have limited pivotal movement and that the cushions $b^3$ will receive and absorb the jar or jolt due to the weight of said motor, thus very materially relieving the strain on the frame of the vehicle therefrom.

In the preferable construction shown the motor B is of the type comprising two armatures under the influence of one magnetic field, said armature-shafts being operatively connected to different sections of the rear axle $A'$.

In the preferable construction shown the driving connection between the armature-shafts and the sections of the axle $A'$ is as follows: Rigidly secured to the sections of said axle are spiral gears C, with which engage pinions $C'$, secured to shafts $C^2$, revolubly mounted in suitable bearings in the bracket or frame-piece $B^3$ in substantial alinement with the armature-shafts of the motor B. The pinion-shafts $C^2$ are connected to the armature-shafts of the motor B by universal joints $C^3$, the transverse axis of which coincide with the axis about which the motor B is pivotally movable. With this construction it is obvious that the pinion-shafts $C^2$ will be unaffected by movement of the motor B about its point of pivotal support.

In the preferable construction shown the pinions $C'$ are splined to the pinion-shafts $C^2$, and inserted between said pinions and rigid portions of the housing or bracket $B^3$ are cushions, preferably involute springs $C^4$. Provision is thus made for limited movement of said pinions longitudinally of their shafts, and thus tangentially of the gears C. With the described construction it is obvious that when the armature-shafts are rotating the pinions $C'$ will exert a yielding strain or pull on the gears C and that in starting rotation of the armature-shafts will first force the pinions $C'$ lengthwise of the pinion-shafts $C^2$ until the resistance to their endwise movement is sufficient to overcome the inertia of the vehicle and its operative parts. In this manner the motor in starting is enabled to pick up its load gradually in the desired manner, and thus to start the vehicle from a position of rest without a sudden jerk. Said cushions or springs $C^4$ also operate to absorb or distribute all jerking motion of the vehicle due to suddenly-varying resistances to the movement of the vehicle, thus causing the vehicle to run much more smoothly than though the connection between the armature-shafts and the driving or traction wheels were rigid.

The armature-shafts being independent of each other, provision is made for independent rotation of the driving or traction wheels, and the armatures being in the same magnetic field are energized thereby proportionately to the loads thereon, respectively, and in case one of said armatures becomes inoperative the other assumes the entire load and develops practically the full power and efficiency of the motor.

As shown at $c$, the pinion-shafts $C^2$ are provided with antifriction thrust-bearings, whereby their frictional resistance is materially reduced.

Any desired or approved form of brake may be employed to stop the vehicle. As shown, a band-brake D is used, which may also be of any usual construction, forming no part of the present invention.

In the preferable construction shown the brake-drum $D'$ consists of separate sections secured to the adjacent ends of the sections of the rear axle $A'$, so that the exteriors thereof will be continuous. A single band D will thus serve to brake both sections of the axle. As shown, also, the sections of the brake-drum instead of being secured directly to the sections of the axle $A'$ are secured to extensions of the hubs of the spiral gears C.

While I prefer to use a double-armature motor and to support it in the manner shown in Figs. 1 to 6 of the drawings as regards most of its features, my invention contemplates equally the use of a single-armature motor and supporting the motor directly from the vehicle-frame.

In Figs. 7 to 9 of the drawings I have illustrated a motor-vehicle of my invention embodying such modifications, which I will now describe, said description being limited to features of difference, as features common to both will be readily and fully understood from the description of the preferred form of the invention, the same or corresponding parts being designated by the same reference-letters in both forms.

In the vehicle-frame shown in Figs. 7 to 9 the rear-axle support A is connected to the front-axle support (not shown) by side bars $A^5$, said frame being of the general type shown, described, and claimed in an application filed by me in the United States Patent Office on the 25th day of June, 1901, and numbered serially 65,942. The forward end of the motor B rests upon and is supported by a rod $B^6$, secured to the side bars $A^5$ of the vehicle-frame, the spring of the frame being relied upon to relieve the jolt due to the weight of the motor instead of cushions or springs, as in the preferred form. The rear axle $A'$ comprises separate sections connected by means of a differential gear E, adapted to allow rotation of the sections of the axle relatively to each other, as in turning the vehicle, in a familiar manner. Any desired or approved form of differential gear may be used. As shown, the differential gear E comprises a casing having an exterior cylindrical surface, to which the band-brake D is applied. As shown, also, the gearing or driving connection between the armature-shaft and the rear axle $A'$ is inclosed in a suitable casing F to exclude dust and grit therefrom.

While I have herein shown the armature-shafts connected to the axle A' by means of a spiral gear, I do not desire to be limited thereto, as my invention contemplates the use of other forms of gears, particularly worm-gears.

I claim—

1. In a motor-vehicle, the combination of a vehicle-frame comprising a transverse frame member, a reach which terminates short thereof and truss-rods or struts which connect said reach with said transverse frame member, a motor pivoted to said transverse frame member at one side and connected to the reach of the frame at its opposite side, substantially as described.

2. The combination with a vehicle-frame comprising a reach which terminates short of the axle and truss-rods or struts which connect said reach with a transverse frame member, of a motor pivoted to said transverse frame member at one side and yieldingly connected to the end of the reach at its opposite side, substantially as described.

3. The combination with a vehicle-frame comprising a transverse frame member, a reach which terminates short of said transverse frame member and truss-rods or struts which connect said reach with said transverse frame member, of a motor pivoted to said transverse frame member at one side and yieldingly connected to the end of the reach at its opposite side, said connection comprising an arm on said motor and a head on the reach, a pin rigidly secured in one thereof which engages a hole or opening in the other and a cushion beneath the arm on said motor, substantially as described.

4. In a motor-vehicle, the combination of a vehicle-frame comprising an axle-support, a reach which terminates short of said axle-support and truss-rods or struts which connect said axle-support and said reach, an axle revolubly mounted in suitable bearings in said axle-support, a motor pivoted to said axle-support at one end and yieldingly connected to the end of the reach at its opposite end and flexible driving connection between said motor and said axle, substantially as described.

5. In a motor-vehicle, the combination of a vehicle-frame comprising an axle-support, an axle revolubly mounted therein, a reach which terminates short of said axle-support, and truss-rods or struts which connect said axle-support with said reach, arms on said axle-support, a motor pivoted to said arms at one end and yieldingly connected to the end of the reach at its opposite end, said connection comprising an arm on said motor, a head on said reach, a pin in one thereof which engages a hole or opening in the other and a cushion beneath the arm on said motor, and a flexible driving connection between said motor and said axle, substantially as described.

6. In a motor-vehicle, the combination of a revoluble axle, a motor pivotally supported at one end adjacent to said axle eccentrically thereto, a gear secured to said axle, a pinion which engages said gear, a shaft to which said pinion is secured and driving connection between said pinion-shaft and the motor-shaft consisting of a universal joint the transverse axis of which coincides with the pivotal axis of said motor, substantially as described.

7. In a motor-vehicle, the combination of a revoluble axle, a motor pivotally supported at one end adjacent to said axle eccentrically thereto, a gear secured to said axle, a pinion which engages with said gear, a shaft to which said pinion is splined, cushions against which the ends of said pinion abut and flexible driving connection between said pinion-shaft and the motor-shaft, substantially as described.

8. In a motor-vehicle, the combination of a revoluble axle, a motor pivotally supported at one end adjacent to said axle eccentrically thereto, a gear secured to said axle, a pinion which engages said gear, a shaft to which said pinion is splined, cushions against which the ends of said pinion abut and flexible driving connection between said pinion-shaft and the motor-shaft consisting of a universal joint the transverse axis of which coincides with the pivotal axis of said motor, substantially as described.

9. In a motor-vehicle, the combination of a revoluble axle, a motor pivoted at one end adjacent to said axle eccentrically thereto and yieldingly supported at its opposite end, a gear secured to said axle, a pinion which engages with said gear, a shaft to which said pinion is secured and flexible connection between said pinion-shaft and the motor-shaft, substantially as described.

10. In a motor-vehicle, the combination of a revoluble axle, a motor pivoted at one end adjacent to said axle eccentrically thereto and yieldingly supported at its opposite end, a gear secured to said axle, a pinion which engages said gear, a shaft to which said pinion is secured and flexible driving connection between said pinion-shaft and the motor-shaft consisting of a universal joint the transverse axis of which coincides with the pivotal axis of said motor, substantially as described.

11. In a motor-vehicle, the combination of a revoluble axle, a motor pivoted at one end adjacent to said axle eccentrically thereto and yieldingly supported at its opposite end, a gear secured to said axle, a pinion which engages with said gear, a shaft to which said pinion is splined, cushions against which the ends of said pinion abut and flexible connection between said pinion-shaft and the motor-shaft, substantially as described.

12. In a motor-vehicle, the combination of a revoluble axle, a motor pivoted at one end adjacent to said axle eccentrically thereto and yieldingly supported at its opposite end, a gear secured to said axle, a pinion which engages with said gear, a shaft to which said pinion is splined, cushions against which the ends of said pinion abut and flexible driving connection between said pinion-shaft and the motor-shaft consisting of a universal joint the transverse axis of which coincides with the pivotal axis of said motor, substantially as described.

13. In a motor-vehicle, the combination of an axle-support, an axle revolubly mounted in suitable bearings therein, a motor pivoted upon said axle-support at one end eccentrically to said axle, a gear secured to said axle, a pinion which engages said gear, a shaft to which said pinion is secured and flexible connection between said pinion-shaft and the motor-shaft, substantially as described.

14. In a motor-vehicle, the combination of an axle-support, an axle revolubly mounted in suitable bearings therein, a motor pivoted upon said axle-support at one end eccentrically to said axle, a gear secured to said axle, a pinion which engages said gear, a shaft to which said pinion is secured and flexible connection between said pinion-shaft and the motor-shaft consisting of a universal joint the transverse axis of which coincides with the pivotal axis of said motor, substantially as described.

15. In a motor-vehicle, the combination of an axle-support, an axle revolubly mounted in suitable bearings therein, a motor pivoted upon said axle-support at one end eccentrically to said axle, and yieldingly supported at its opposite end, a gear secured to said axle, a pinion which engages said gear, a shaft to which said pinion is secured and flexible connection between said pinion-shaft and the motor-shaft, substantially as described.

16. In a motor-vehicle, the combination of an axle-support, an axle revolubly mounted in suitable bearings therein, a motor pivoted upon said axle-support at one end eccentrically to said axle and yieldingly supported at its opposite end, a gear secured to said axle, a pinion which engages said gear, a shaft to which said pinion is secured and flexible connection between said pinion-shaft and the motor-shaft consisting of a universal joint the transverse axis of which coincides with the pivotal axis of said motor, substantially as described.

17. In a motor-vehicle, the combination of a vehicle-frame comprising an axle-support, a reach which terminates short of said axle-support and truss-rods which connect said reach and said axle-support, a motor pivoted to said axle-support at one end and yieldingly connected to the reach of the vehicle at its opposite end, said connection comprising an arm on said motor, a head on the reach, a pin rigidly secured in one thereof which engages a hole or opening in the other and a cushion beneath the arm on said motor, an axle revolubly mounted in suitable bearings in said axle-support, a gear secured to said axle, a pinion which engages with said gear, a shaft to which said pinion is secured and flexible connection between said pinion-shaft and the shaft of the motor, substantially as described.

18. In a motor-vehicle, the combination of a vehicle-frame comprising an axle-support, a reach which terminates short of said axle-support and truss-rods which connect said reach and said axle-support, a motor pivoted to said axle-support at one end and yieldingly connected to the reach of the vehicle at its opposite end, said connection comprising an arm on the motor, a head on the reach, a pin in one thereof which engages a hole or opening in the other and a cushion on which the arm on the motor rests, an axle revolubly mounted in suitable bearings in said axle-support, a gear secured to said axle, a pinion which engages with said gear, a shaft to which said pinion is splined, cushions against which the ends of said pinion abut and flexible driving connection between said pinion-shaft and the shaft of the motor, substantially as described.

In testimony that I claim the foregoing as my invention I affix my signature, in presence of two subscribing witnesses, this 22d day of June, A. D. 1901.

WALTER A. CROWDUS.

Witnesses:
 JOHN A. McKEOWN,
 M. S. SOMERVILLE.